(12) United States Patent
Berechet et al.

(10) Patent No.: US 12,223,749 B2
(45) Date of Patent: Feb. 11, 2025

(54) OBJECT RECOGNITION METHOD WITH INCREASED REPRESENTATIVENESS

(71) Applicants: THALES, Courbevoie (FR); SISPIA, Vincennes (FR)

(72) Inventors: Ion Berechet, Vincennes (FR); Gérard Berginc, Elancourt (FR); Stefan Berechet, Vincennes (FR)

(73) Assignees: THALES, Courbevoie (FR); SISPIA, Vincennes (FR)

(*) Notice: Subject to any disclaimer, the term of this patent is extended or adjusted under 35 U.S.C. 154(b) by 361 days.

(21) Appl. No.: 17/767,907

(22) PCT Filed: Oct. 8, 2020

(86) PCT No.: PCT/EP2020/078197
§ 371 (c)(1),
(2) Date: Apr. 10, 2022

(87) PCT Pub. No.: WO2021/069536
PCT Pub. Date: Apr. 15, 2021

(65) Prior Publication Data
US 2023/0222820 A1 Jul. 13, 2023

(30) Foreign Application Priority Data
Oct. 10, 2019 (FR) ..................... 1911224

(51) Int. Cl.
*G06V 20/64* (2022.01)
*G06V 10/774* (2022.01)
*G06V 10/82* (2022.01)

(52) U.S. Cl.
CPC .......... *G06V 20/647* (2022.01); *G06V 10/774* (2022.01); *G06V 10/82* (2022.01); *G06V 2201/07* (2022.01)

(58) Field of Classification Search
CPC .... G06V 20/647; G06V 10/774; G06V 10/82; G06V 2201/07
See application file for complete search history.

(56) References Cited

U.S. PATENT DOCUMENTS 6,324,475 B1 * 11/2001 Potteck ............... G06V 10/757
250/203.1
8,836,762 B2 9/2014 Berginc et al.
(Continued)

FOREIGN PATENT DOCUMENTS

EP 2 333 481 B1 10/2014
WO 2016/097168 A1 6/2016

OTHER PUBLICATIONS

Liang, et al., "Object Recognition Based on Three-Dimensional Model", International Conference on Pervasive Computing, pp. 218-225, 2012.
(Continued)

*Primary Examiner* — Iriana Cruz
(74) *Attorney, Agent, or Firm* — BakerHostetler

(57) ABSTRACT

A method for an object of interest in a degraded 2D digital image of the object is provided. The method includes the following steps: detecting, beforehand, the object of interest in a 2D digital image and assigning it a label; reconstructing a 3D volume of the object thus labeled from a plurality of available 2D digital images of the object of interest; storing, in a database, a record relating to the object thus reconstructed in 3D form and labeled; for each record thus stored, generating a new plurality of 2D digital images according to a plurality of viewing modes from the thus reconstructed 3D volume of each object; training a neural network on a learning set composed of an expanded set of 2D digital images thus generated and corresponding with the label of the object of interest to be recognized; from a degraded 2D digital image of the object of interest to be recognized; using
(Continued)

the neural network thus trained to deliver as output the label of the object and a confidence index linked to the recognition of the object of interest.

7 Claims, 3 Drawing Sheets

(56) References Cited

U.S. PATENT DOCUMENTS

| | | | | |
|---|---|---|---|---|
| 2017/0262695 | A1* | 9/2017 | Ahmed | G06V 40/165 |
| 2021/0103776 | A1* | 4/2021 | Jiang | G06T 19/20 |
| 2021/0282731 | A1* | 9/2021 | Vaillant | A61B 6/545 |

OTHER PUBLICATIONS

Berechet, et al., "Scattering computation for 3D laser imagery and reconstruction algorithms", Proceedings of SPIE—The International Society for Optical Engineering, 2012.

* cited by examiner

OBJECT RECOGNITION METHOD WITH INCREASED REPRESENTATIVENESS

CROSS-REFERENCE TO RELATED APPLICATIONS

This application is a National Stage of International patent application PCT/EP2020/078197, filed on Oct. 8, 2020, which claims priority to foreign French patent application No. FR 1911224, filed on Oct. 10, 2019, the disclosures of which are incorporated by reference in their entirety.

FIELD OF THE INVENTION

The invention relates to the recognition of objects in digital imaging. It applies generally to the automatic recognition of objects in digital images taken in difficult conditions, in particular the recognition of human beings from two-dimensional (2D) digital images taken randomly, or of objects from digital images taken in difficult conditions (fog, great distance, occlusion of the object, exposure angle, low-resolution image, etc.).

BACKGROUND

The field of artificial intelligence (AI) is currently undergoing exponential growth in many sectors. This growth is explained by the conjunction of three concomitant factors: the development of learning algorithms called "Machine and/or Deep Learning"; the emergence of large databases on the Internet ("big data") and the increase in computation speed of the computers being used to train the learning algorithms.

Generally, the recognition of objects in AI is based on learning data sets, also simply called "data sets". In practice, each learning set comprises input data culminating in the creation of a model to supply an output called the label of the image. For example, in supervised learning (classification), the output is known and the aim is to have the algorithm learn to respond on its own to deliver the label of the object thus recognized in the image to be processed.

It is known that, to train a supervised learning algorithm, it is necessary to have a great quantity of labeled input data. Now, currently, the databases or banks of digital images generally rely on digital images of labeled objects, the variability of which in terms of exposure angle is relatively limited and/or summary (transformation of the image via rotations, shifts, addition/removal of noises, etc.). Furthermore, the variability in human recognition is relatively restrictive (for example images of the person to be recognized from only the face thereof).

SUMMARY OF THE INVENTION

The aim of the present invention is to improve the situation, notably by providing a solution that at least partially overcomes the abovementioned drawbacks.

To this end, the present invention proposes a method for recognizing an object of interest in a degraded 2D digital image of said object.

According to a general definition of the invention, the method comprises the following steps:
  detecting, beforehand, the object of interest in a 2D digital image and assigning it a label;
  reconstructing a three-dimensional (3D) volume of said object thus labeled from a plurality of available 2D digital images of said object of interest;
  storing, in a database, at least one record relating to said object thus reconstructed in 3D form and labeled;
  for each record thus stored,
    generating a new plurality of 2D digital images according to a plurality of viewing modes from the thus reconstructed 3D volume of each object, the exposure modes comprising exposure modes with different levels of occlusion and/or of added noise;
    training a neural network on a learning set composed of an expanded set of 2D digital images thus generated and corresponding with the label of the object of interest to be recognized;
  from a degraded 2D digital image of said object of interest to be recognized; using the neural network thus trained to deliver as output the label of the object and a confidence index linked to the recognition of the object of interest.

Surprisingly, the Applicant has observed that the generation of a new plurality of 2D digital images from the reconstructed 3D volume of the object makes it possible to increase representativeness (variability) of the learning sets (data set) and thus improve the confidence index of the recognition on a 2D image of the object to be recognized, even if the 2D image is degraded.

According to preferred embodiments, the invention comprises one or more of the following features which can be used separately or in partial combination with one another or in total combination with one another:
  if the confidence index is above a threshold, stopping the recognition, otherwise searching for other elements to increase the success of the identification;
  as a nonlimiting example, the 3D volume reconstruction is of reflective tomography type;
  as a nonlimiting example, the size of the reconstructed 3D volume of the object is 262×262×257 pixels;
  the plurality of 2D images deriving from the reconstructed 3D volume of the object belong to the group formed by 2D images at various angles (theta, phi, Phi, etc.); images at different distances; images with different occlusion rates, images with different noises;
  the plurality of 2D images derived from the reconstructed 3D volume for objects of interest, of human being type, belong to the group formed by accessories such as cap, spectacles, sunglasses and beard.
  as a nonlimiting example, the resolution of the 2D digital images thus generated is 124 pixels×253 pixels;
  as a nonlimiting example, the neural network is a convolutional neural network of ResNet50, ResNet101 or ResNet152 type (Residual Network with, respectively, 50, 101 or 152 layers of neurons).

The invention further relates to a computer program comprising program instructions for the execution of a method as previously defined, when said program is run on a computer.

Other features and advantages of the invention will emerge on reading the following description of a preferred embodiment of the invention, given as an example and with reference to the attached drawings.

BRIEF DESCRIPTION OF THE DRAWINGS

Other advantages and features of the invention will emerge on studying the description and the drawings in which.

DETAILED DESCRIPTION

Figure 1:
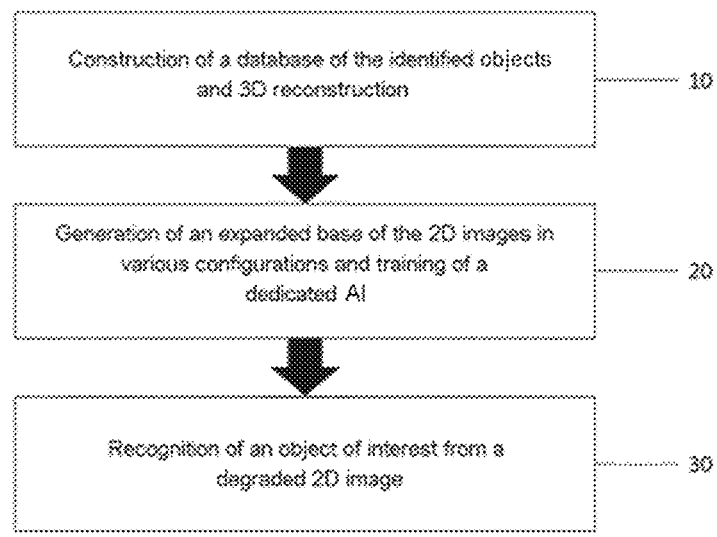
FIG. 1 schematically represents the main steps of the recognition method according to the invention.
Figure 2:
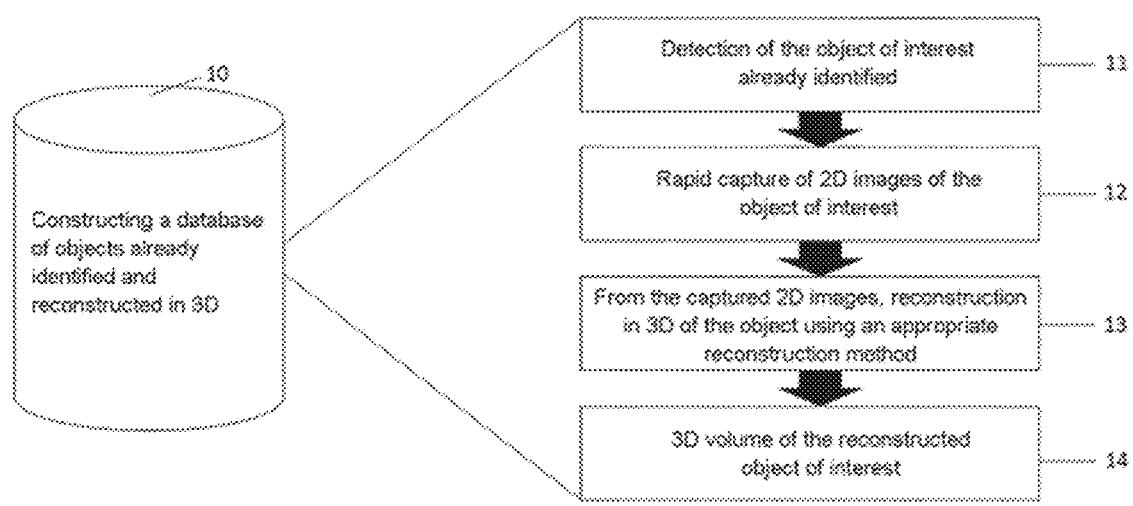
FIG. 2 schematically represents the substeps of the step of construction of a database according to the method according to the invention.
Figure 3:
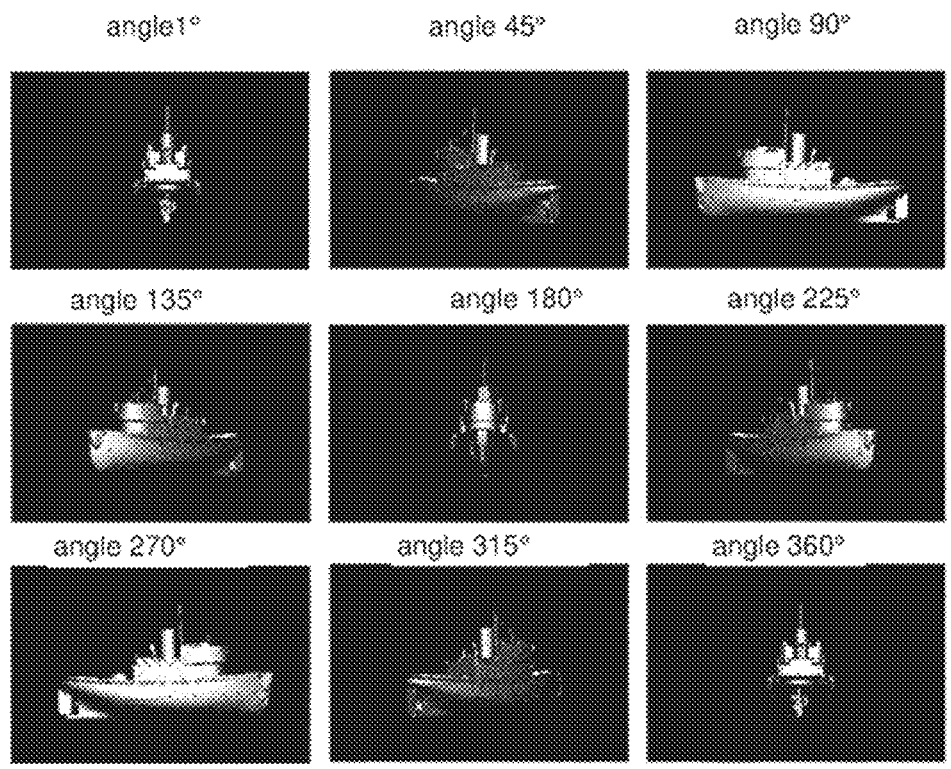
FIG. 3 schematically represents examples of 2D images of a boat taken in SWIR infrared (short-wave infrared) in a horizontal plane from 9 different angles for the 3D reconstruction of the object.
Figure 4:
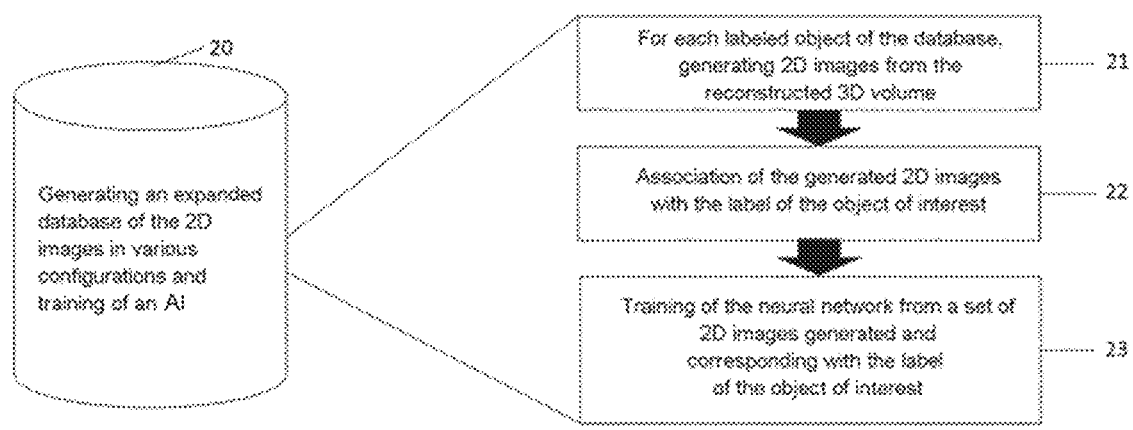
FIG. 4 schematically represents the substeps of the step of generation of an expanded database according to the method according to the invention.
Figure 5:
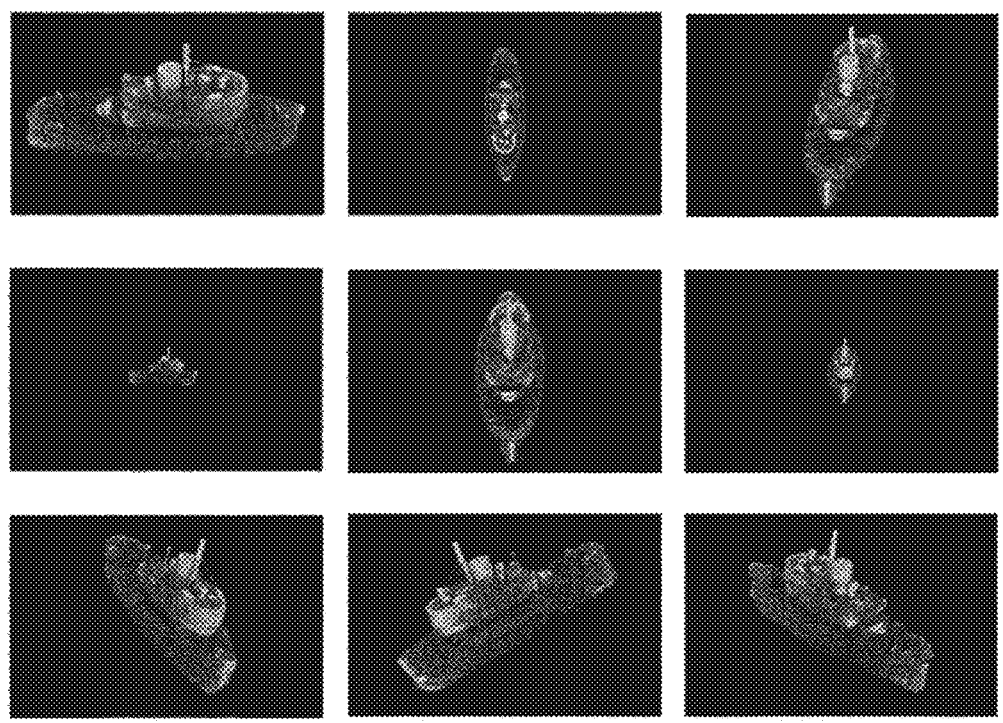
FIG. 5 schematically represents examples of records of the database of 2D images for the object labeled "boat2E0A0" generated with various points of view and distance from the 3D volume of the object reconstructed from the 2D images of FIG. 3.

Referring to FIGS. 1 to 5, represented are the three main steps of the method for automatic recognition of objects in difficult conditions by an AI trained on a database of labeled images of which the representativeness has been increased via 3D reconstructions of said objects.

The object of the first main step 10 is to construct a database of objects already identified and reconstructed in 3D.

The step 10 begins with a substep of preliminary detection of the object of interest 11 (for example a boat) already identified. Next, there is a rapid taking 12 of 2D images (visible, infrared, active or passive) in numbers that are limited but sufficient to carry out a 3D reconstruction of the object. Depending on the context of the object, the taking of the 2D images can be performed according to several scenarios such as the "ground-ground" scenario, the "sea-sea" scenario, the "air-ground" scenario and the "air-sea" scenario. For a boat, the taking of the images can be performed according to scenarios such as the "sea-sea" scenario and the "air-sea" scenario. For example, referring to FIG. 3, examples of 2D images of a boat taken in SWIR in a horizontal plane ("sea-sea" scenario) from 9 different angles for the 3D reconstruction of the object are represented.

From the 2D images thus available (FIG. 3), the 3D reconstruction 13 of the object is performed using an appropriate reconstruction method (reflective tomography, for example). A three-dimensional (3D) volume 14 of the object (in voxels) is then obtained.

In practice, the three-dimensional volume can be obtained using a reconstruction method based on transmission or on fluorescence (optical projection tomography, nuclear imaging or x-ray computed tomography) or based on reflection (back-reflection of a laser wave) or based on solar reflection in the case of the visible band (between 0.4 µm and 0.7 µm) or the near infrared (between 0.7 µm and 1 µm) or SWIR (between 1 µm and 3 µm), or by taking into account the thermal emission of the object (thermal imaging between 3 µm and 5 µm and between 8 µm and 12 µm); this three-dimensional reconstruction process is described in the patent "Optronic system and method dedicated to identification for formulating three-dimensional images" (U.S. Pat. No. 8,836,762 B2, EP2333481B1).

The set of voxels derived from a three-dimensional reconstruction with the associated intensity is used, this reconstruction preferably having been obtained by back-reflection.

At the end of the 3D reconstruction, there is a database comprising records relating to the objects already identified, i.e. {3Dvolume_Object(n) Label_Object(n)}, n=1, 2, ..., N (N being the number of records of identified objects).

It should be noted that the database can be enriched with objects from modelings or simulations.

The second main step 20 of the method according to the invention consists in generating an expanded database of the 2D images in various configurations and training of a dedicated AI (artificial intelligence).

In practice, for each labeled object of the database, there is the generation 21 of 2D images derived (seen) from the 3D volume thus reconstructed.

In a set of embodiments of the invention, the 3D volume is delimited externally by a 3D surface, and, if the volume is incomplete, the 3D surface is open.

For example, the views derived from the 3D volume are produced according to various angles (theta, phi, Phi), at different distances. In a set of embodiments of the invention, the 3D volume can also be modified, with, for example, by the application of different rates of occlusion and/or with different added noises.

In a set of embodiments of the invention, the addition of noise on the 3D surface, or of an occlusion, thus leads to a modification of the initial 3D surface, generating new 2D images.

For faces, the views derived from the reconstructed 3D volume of the human being to be identified can be of different kinds and with or without accessories such as cap, spectacles, sunglasses, beard, etc.

In a set of embodiments of the invention, the accessories are locally superposed on elements of the 3D surface, which makes it possible to modify the 3D boundary of the reconstructed volume.

The plurality of 2D digital images thus generated according to a plurality of exposure modes from the modified or unmodified 3D volume of each object are then associated 22 with the label of the object. Thus, a large number of 2D views, corresponding to different points of view of the 3D volume, and if necessary modifications thereof, can be added to the learning database.

The following elements are then obtained: 3Dvolume_Object(n)→{2Dimage_Object(n, theta, phi, Phi, distance, Occlusion_rate, etc.), Label_Object(n)}

Finally, a convolutional neural network is chosen, for example of residual network type such as ResNet50, to be trained 23 on a learning set composed of a set of 2D digital images {2Dimages_Object(n)} thus generated and corresponding with the labels {Labels_Object(n)}, n=1, 2, 3, ..., N for all the objects N of interest.

The third main step 30 consists in recognizing an object of interest from a degraded 2D image thereof.

For example, the preliminary detection of an ObjectX of interest consists of a taking of one or more 2D images (in visible, infrared, active or passive) in restrictive operational conditions (degraded weather, great distance, occlusions of the object, any exposure angle, etc.).

Next, the convolutional neural network thus trained is used to deliver as output the label of the object of interest and a confidence index (score) linked to the recognition of the object of interest.

If the confidence index (score) is high (greater than 95%, for example), provision is made to stop the recognition.

If the degree of confidence (score) is low, then the operator can search for other elements to increase the success of the identification.

As the database of the objects already identified and reconstructed grows, the recognition reliability of the dedicated AI becomes stronger and, implicitly, the more successful will be the identification of any object.

As a nonlimiting example, the recognition method was applied to a boat labeled "boat2E0A0" from a single 2D image produced from an exposure at right angles to the surface of the sea ("air-sea" scenario), this image not belonging to the learning 2D database. The image was redimensioned with a resolution of 124 pixels×253 pixels for compatibility with the AI interrogation process.

The invention claimed is:

1. A method for recognizing an object of interest in a degraded 2D digital image of said object, comprising the following steps: detecting, beforehand, the object of interest in a 2D digital image and assigning it a label; reconstructing a 3D volume of said object thus labeled from a plurality of available 2D digital images of said object of interest; storing, in a database, a record relating to said object thus reconstructed in 3D form and labeled; for each record thus stored, generating a new plurality of 2D digital images according to a plurality of viewing modes from the thus reconstructed 3D volume of each object, the viewing modes comprising exposure modes with different levels of occlusion and/or of added noise; training a neural network on a learning set composed of an expanded set of 2D digital images thus generated and corresponding with the label of the object of interest to be recognized; from a degraded 2D digital image of said object of interest to be recognized, using the neural network thus trained to deliver as output the label of the object and a confidence index linked to the recognition of the object of interest.

2. The method as claimed in claim 1, wherein, if the confidence index is above a threshold, provision is made to stop the recognition, and otherwise search for other elements to increase the success of the identification.

3. The method as claimed in claim 1, wherein the 3D volume reconstruction of the object belongs to the group formed by reflective tomography and transmission tomography.

4. The method as claimed in claim 1, wherein the plurality of 2D images derived from the reconstructed 3D volume of the object belong to the group formed by 2D viewing mode images from the 3D volume taken at various angles (theta, phi, Phi, etc.), images taken at different distances; images with different occlusion rates, images with different noises.

5. The method as claimed in claim 1, wherein the plurality of 2D images derived from the reconstructed 3D volume for objects of interest, of human being type, belong to the group formed by accessories such as cap, spectacles, sunglasses and beard.

6. The method as claimed in claim 1, wherein the neural network is a convolutional neural network of the type belonging to the group formed by ResNet50, ResNet101, ResNet152.

7. A computer comprising program instructions stored on a computer causing the execution of a method as claimed in claim 1, when said program is run on said computer.

* * * * *